US012632608B2

(12) United States Patent　(10) Patent No.: US 12,632,608 B2

Pelissier et al.　(45) Date of Patent: May 19, 2026

(54) INTEGRATED CIRCUIT DEVICE WITH PROTECTION AGAINST MALICIOUS ATTACKS

(71) Applicant: NAGRAVISION Sàrl, Cheseaux-sur-Lausanne (CH)

(72) Inventors: Sylvain Pelissier, Cheseaux-sur-Lausanne (CH); Pascal Aubry, Cheseaux-sur-Lausanne (CH)

(73) Assignee: NAGRAVISION SARL, Cheseaux-sur-Lausanne (CH)

( * ) Notice: Subject to any disclaimer, the term of this patent is extended or adjusted under 35 U.S.C. 154(b) by 616 days.

(21) Appl. No.: 18/004,333

(22) PCT Filed: Jul. 8, 2021

(86) PCT No.: PCT/EP2021/069077

§ 371 (c)(1),
(2) Date: Jan. 5, 2023

(87) PCT Pub. No.: WO2022/008692

PCT Pub. Date: Jan. 13, 2022

(65) Prior Publication Data

US 2023/0222251 A1　Jul. 13, 2023

(30) Foreign Application Priority Data

Jul. 10, 2020　(EP) ..................................... 20185298

(51) Int. Cl.
*G06F 21/75*　(2013.01)
*G06F 21/55*　(2013.01)
(52) U.S. Cl.
CPC ............ *G06F 21/75* (2013.01); *G06F 21/554* (2013.01)

(58) Field of Classification Search
CPC ............................... G06F 21/75; G06F 21/554
(Continued)

(56) References Cited

U.S. PATENT DOCUMENTS

| | | | |
|---|---|---|---|
| 7,847,581 B2 * | 12/2010 | Lisart .................... | H01L 23/576 326/14 |
| 2005/0092848 A1 * | 5/2005 | Beit-Grogger ........ | H01L 23/576 235/492 |

(Continued)

FOREIGN PATENT DOCUMENTS

| | | |
|---|---|---|
| EP | 3 291 293 A1 | 3/2018 |
| FR | 3 035 267 A1 | 10/2016 |

(Continued)

OTHER PUBLICATIONS

International Search Report & Written Opinion issued Oct. 20, 2021 in PCT/EP2021/069077 filed on Jul. 8, 2021, 14 pages.

(Continued)

*Primary Examiner* — Dereena T Cattungal
(74) *Attorney, Agent, or Firm* — POLSINELLI LLP

(57) ABSTRACT

An integrated circuit device includes a semiconductor substrate layer and at least one active layer including electronic components and supported by the semiconductor substrate layer. The semiconductor substrate layer and the at least one active layer are sandwiched between two protective layers acting as physical obstacles to prevent the passage of radiations. In addition, the two protective layers are electrically connected to a detection circuit that can monitor an electrical information of the protective layers and detect a physical attack of at least one of the two protective layers, based on the monitored electrical information.

20 Claims, 3 Drawing Sheets

(58) Field of Classification Search
USPC ........................................................ 726/22
See application file for complete search history.

(56) References Cited

U.S. PATENT DOCUMENTS

| | | | |
|---|---|---|---|
| 2009/0001821 A1 | 1/2009 | Walker et al. | |
| 2016/0307855 A1* | 10/2016 | Charbonnier | H01L 23/573 |
| 2018/0061781 A1* | 3/2018 | Petitdidier | H01L 23/57 |
| 2018/0308808 A1* | 10/2018 | Kirschner | G06F 30/394 |
| 2019/0148313 A1* | 5/2019 | Jullian | H01L 23/576 |
| | | | 257/499 |
| 2021/0035924 A1* | 2/2021 | Best | G06F 21/87 |

FOREIGN PATENT DOCUMENTS

| | | |
|---|---|---|
| JP | 2007-227498 A | 9/2007 |
| WO | WO 2007/086046 A2 | 8/2007 |
| WO | WO 2019/055307 A1 | 3/2019 |

OTHER PUBLICATIONS

Extended European Search Report & Written Opinion issued Dec. 23, 2020 in European Application 20 18 5298 filed on Jul. 10, 2020, 7 pages.

* cited by examiner

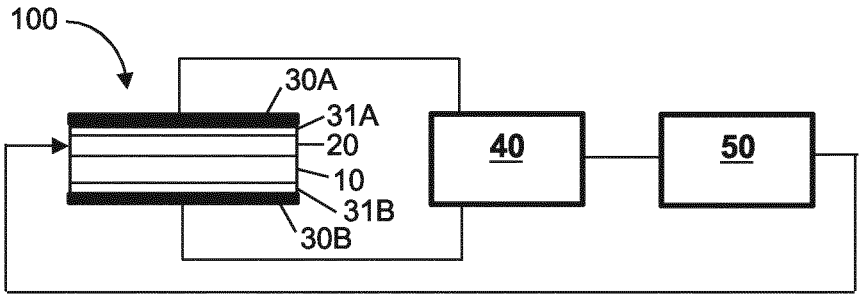
Fig. 3
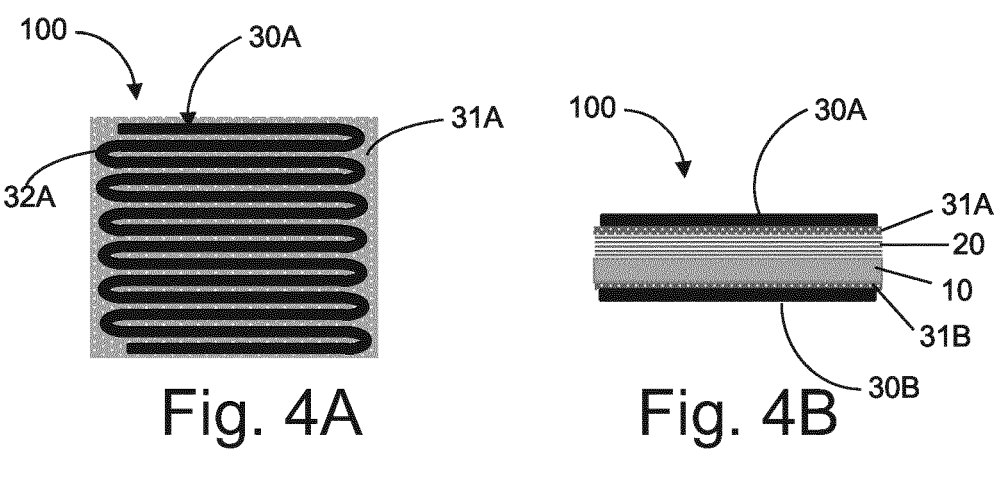
Fig. 4A
Fig. 4B
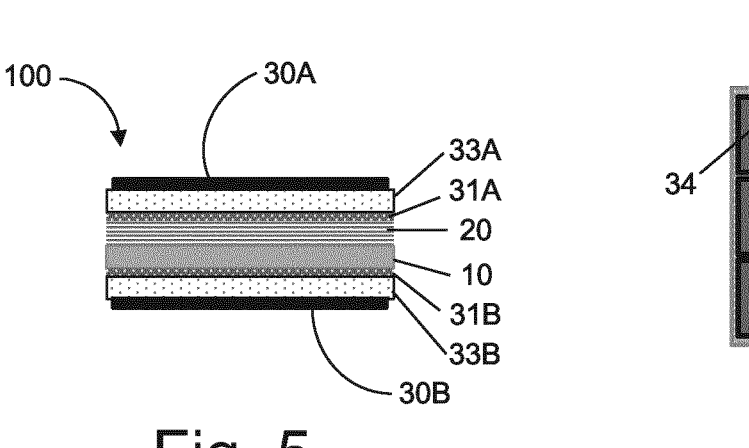
Fig. 5
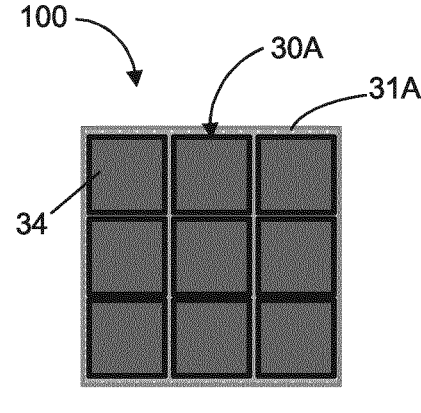
Fig. 6

INTEGRATED CIRCUIT DEVICE WITH PROTECTION AGAINST MALICIOUS ATTACKS

TECHNICAL FIELD

The present disclosure relates to the field of integrated circuit protection against malicious attacks like side-channel attacks and fault attacks.

BACKGROUND

In computer security, security is typically provided by cryptographic algorithms that are designed to be extremely difficult to break mathematically. Input and output messages are available to attackers, but the secret information (e.g. the secret key of an encryption algorithm) is not available. For well-studied algorithms, an attacker must perform a crypt-analysis requiring an unpractical amount of computational power to obtain the secret information.

However, it has been shown that hardware and software implementations of cryptographic algorithms or protocols are vulnerable to side channel attacks and fault attacks that do not require such a complex cryptanalysis. Both techniques can be used to obtain the secret information (e.g. secret key(s)) stored in an embedded device such as an integrated circuit implementing cryptographic algorithm(s).

Side channel attacks are based on the principle that the secret information can leak through side channels. It can be defined as any attack based on information gained from the implementation of a computer system, rather than weaknesses in the implemented algorithm itself. Side channels are physical information leakages, for example the time needed to perform an encryption, the power consumed to the hardware implementation to execute an encryption algorithm, electromagnetic radiations emanating from the circuits executing the encryption or decryption, or even sound. The side channel attacks have proven to be effective and require low cost and/or a reduced number of experiments.

Fault attacks consist in intentionally triggering computational faults in the cryptographic algorithms to obtain faulty outputs or fault behaviors, which allow to obtain the secret information. Fault injections using for example a laser source or an electromagnetic source are used to alter the behavior of the cryptographic device and obtain information leakage under faulty environment. For example, Body Bias Injection (BBI) is a fault injection method that consists in applying a high voltage pulse on the circuit substrate to induce faults.

WO 96/16378 A1 discloses a security device including a first integrated circuit having a memory area storing secret information and a second integrated circuit arranged above the first integrated circuit and covering the memory area (and any other sensible circuit) to form an obstacle and prevent from access to the memory area. The two integrated circuits are joined together through an adhesive layer and are connected in order to communicate with each other. In operation, a periodical communication is established between the two integrated circuits to execute a mutual authentication procedure. If one of the two integrated circuits fails to authenticate, the secret information is erased from the memory area. In order to access the memory area, an attacker needs to remove the second integrated circuit, which results in interrupting the connection between the two integrated circuits.

U.S. Pat. No. 5,881,155 A discloses a security device for preventing access to secret information stored in a semiconductor chip (protected chip) comprising a second semiconductor chip (protective chip). The two chips are coupled to each other by communication terminals. A semiconductor resin having a non-homogeneous resistivity is sandwiched between the protected chip and the protective chip. The protective chip has means that measure a plurality of resistances through the resin and means for determining an encryption key ("resistive key") by processing the measured resistances. When the security device is initialized, the measuring means measure a certain number of resistances through the semi-conductor resin. The measured values of resistance are then processed to determine the resistive key that is communicated to the protected ship through communication terminals in order to encrypt and decrypt information. In this configuration, a physical attack on the protected chip would not provide access the secret information (resistive key). In addition, it presupposes access to the active surface of the chip and therefore destruction of the semiconductor layer, which permanently prevents from reconstruction of the resistive key.

WO 99/12204 A1 discloses a security integrated circuit comprising an active layer and a complementary layer, joined together through an intermediate sealing layer. The "active" layer includes a substrate sub-layer in a semiconductor material and, above the substrate sub-layer, an active sub-layer integrating electronic circuits and having memory. This active layer is thinned. The complementary layer is made of a semi-conductor material. The intermediate sealing layer is made of an electrically insulating material. When an attacker wants to access the integrated circuits, he needs to separate the complementary layer from the active layer by applying traction forces. As the active layer is thinned and thus weakened, such traction forces would inevitably break the active layer, which would make impossible to extract the secret information.

The security devices of the prior art are complicated to implement and design. Moreover, they provide a protection against physical attacks only from one side of the chip. However, it has recently been shown that attacks from both sides of the chip are feasible. Furthermore, the security devices of the prior art are designed to prevent reading secret information from memory but not to provide an efficient protection against side-channel attacks, electromagnetic fault attacks or body biasing injection attacks.

There is a need to improve the situation.

SUMMARY

The present disclosure concerns an integrated circuit device comprising a semiconductor substrate layer and at least one active layer including electronic components and supported by said semiconductor substrate layer, characterized in that the semiconductor substrate layer and the at least one active layer are sandwiched between two protective layers acting as physical obstacles to prevent the passage of radiations and electrically connected to a detection circuit for monitoring an electrical information of the protective layers and detecting a physical attack of at least one of the two protective layers, based on the monitored electrical information, in order to protect the at least one active layer against a malicious attack, According to the present disclosure, the integrated circuit device uses a protection or shield layer on both sides of the chip (integrated circuit). The two protective layers act as physical obstacles that prevent the passage of internal and/or external radiations. Such a configuration creates a protection that can be compared to a "Faraday cage" effect. It prevents from intrusive attacks using radiations, for example a laser beam or an electromagnetic glitch, coming from both sides of the chip. It also prevents from side-channel attacks based on the detection of the electromagnetic radiations emanating from the active layer(s).

Additionally, in case that an attacker tries to get rid of all or part of one of the protective layers, the detection circuit detects the attack based on the monitored electrical information of the protective layers, and triggers an electronic countermeasure of protection, for example a memory wipe.

Thus, in the present disclosure, the protective layers act as physical shields to protect the integrated circuit(s) against attacks using radiations and are also used as a trigger to activate an electronic countermeasure of protection in case that the integrated circuit device is physically attacked by digging a protective layer. Thus, the present disclosure combines a physical protection and an electronic countermeasure of protection, both allowing to protect the active layer(s) against malicious attacks. The physical protection is actually used as a trigger to execute the electronic countermeasure.

Advantageously, the detection circuit is integrated within the at least one active layer.

The integrated circuit device can further comprise an electronic protection circuit configured to generate a signal for executing an electronic protection countermeasure when a physical attack is detected by the detection circuit.

Advantageously, the electronic protection circuit is integrated within the at least one active layer.

The two protective layers can be configured to prevent the passage of internal and external radiations of the group including laser radiations, electromagnetic emanations from the at least one active layer, electromagnetic radiations produced by an external source (i.e. external to the integrated circuit device).

The two protective layers can be made of metal, or metal alloy, or a semi-conductor material.

In a first embodiment, the integrated circuit device is designed for wire bonding.

In a second embodiment, the integrated circuit device is a flip chip system.

One of the two protective layers or each of the two protective layers can be a full plate.

In a first variant, one of the two protective layers or each of the two protective layers is made of a bent continuous wire forming parallel lines. Optionally, this bent continuous wire can be supported by a printed circuit board.

In another embodiment, the protective layers comprise a mosaic of elementary plates electrically connected to the detection circuit.

The detection circuit can be configured to measure a relative value between respective electrical values of the two protective layers.

In a first example, the detection circuit is configured to measure a capacitance between the two protective layers, as said electrical information of the two protective layers.

In a second example, the detection circuit is configured to measure a difference of electrical resistance between the two protective layers, as said electrical information of the two protective layers.

The detection circuit is configured to detect a deviation of the monitored electrical information from a reference value, out of a tolerance range.

Optionally, the two protective layers are joined to the semiconductor substrate layer and the at least one active layer, through two respective joining layers functioning as electrical insulators.

The present disclosure also concerns a product including an integrated circuit device.

BRIEF DESCRIPTION OF THE DRAWINGS

Other features, purposes and advantages of the disclosure will become more explicit by means of reading the detailed statement of the non-restrictive embodiments made with reference to the accompanying drawings.

FIG. 3 shows an electronic circuit providing an electronic protection to the integrated circuit device.

FIGS. 4A, 4B show a first variant of the integrated circuit device according to the first embodiment.

FIG. 5 shows second variant of the integrated circuit device according to the first embodiment.

FIG. 6 shows a third embodiment of the integrated circuit device.

DETAILED DESCRIPTION

Figure 1:
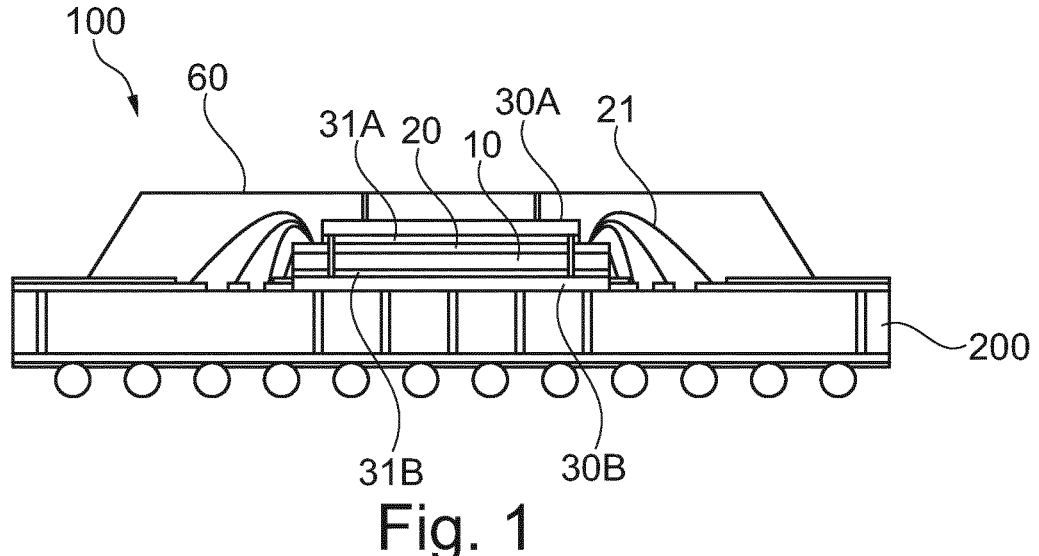
FIG. 1 shows an integrated circuit device according to a first embodiment.

The present disclosure concerns an integrated circuit device that is designed to provide protection against malicious attacks, especially side channel attacks and fault attacks.

An integrated circuit device is a mix of hardware and software implementations that can be designed to execute cryptographic algorithms and/or protocols. These hardware and software implementations are vulnerable to side channel attacks and fault attacks (e.g. fault attacks with a laser beam or glitch electromagnetic attacks). Such attacks can be based on the use of radiations to inject a fault into the integrated circuit device and alter its behavior, or on the detection of radiations emanating from the circuit(s). The present disclosure aims to provide protection against attacks using an external source of radiation(s) (e.g. laser or electromagnetic glitch) directed towards the circuit(s) and attacks based on the detection of radiations emanating from the circuit(s).

As well known by the person skilled in the art, the integrated circuit device 100 comprises a plurality of overlapping layers including a semiconductor substrate layer 10 and at least one active layer 20. The semiconductor substrate layer 10 is made of a semiconductor material. The active layer(s) 20 include electronic components, such as semiconductor components. They also include conductive track(s). One or more electronic circuits or devices can be integrated in these active layer(s).

In the present disclosure, the semiconductor substrate layer 10 and the active layer(s) 20 are sandwiched between two protective or 'shield' layers 30A, 30B acting as physical obstacles to prevent the passage of internal and external radiations. The protective layers are disposed on both sides (top and bottom in FIG. 1 or 2) of the stack of layers 10, 20. They constitute additional overlapping layers. These protective layers are designed to prevent passage of radiations, such as laser radiations and electromagnetic radiations. They produce an effect that can be compared to a 'Faraday cage' effect for protecting the integrated circuit device 100 (especially the active layer(s)). For example, a laser beam emitted by an external source (i.e. external to the integrated circuit device) and directed towards the integrated circuit device hits one of the protective layers and is blocked by this protective layer. In case of an electromagnetic fault injection on one side of the integrated circuit device, the electromagnetic field hits the protective layer arranged on this side and is distributed over it like a Faraday cage, without disrupting the active layer(s). Furthermore, the protective layers absorb radiations coming from the circuit(s) such as the electromagnetic emanations from the circuit(s). As a result, it is very difficult, or even impossible, to obtain a secret information by a side channel attack.

The thickness of each protective layer 30A, 30B can be adapted to provide an efficient protection. Its value can depend on one or more parameters such as the material of the protective layer and a required size for the integrated circuit device and be determined experimentally. For example, this thickness can be comprised between 50 and 200 μm for a given material of the protective layers, in order to offer a good protection and a reduced size. However, for another material, a lesser thickness (e.g. 30 μm) could be efficient too. A thickness higher than 200 μm could also be applied, if there is no requirement on the size of the integrated circuit device. For example, the thickness of each protective layer could be equal to 500 μm.

The protective layers 30A, 30B can be made of a metal, for example copper or aluminum or gold or platinum. Alternatively, they are made of a metal alloy, such as stainless steel (e.g. 300 grade stainless steel), or a semiconductor material.

The protective layers 30A, 30B offer a strong passive protection against side channel attacks, laser attacks and electromagnetic attacks such as electromagnetic fault attacks and Body Biased Injection attacks. Indeed, these shield layers 30A, 30B retain most, if not all, of the electromagnetic emanations on both sides of the integrated circuit device 100, rendering very difficult to acquire side-channel data. They also retain any laser beam directed towards the active layer(s), and most of the electromagnetic signals or needles towards the active layer(s), rendering very difficult to disturb the integrated circuit operation.

Joining or interface layers 31A, 31B can be interposed between the protective layers 30A, 30B, respectively, and the layers 10 and 20, in order to facilitate the adhesion of the protective layers. These joining layers 31A, 31B have the function of joining the protective layer 30A with the active layer(s) 20 and the protective layer 30B with the semiconductor substrate layer 10. They can be made of a specific glue, well known by the person skilled in the art. The material of the joining layers can be an electrically insulating material, as well known by the person skilled in the art. The protective layers 30A, 30B could be joined to the layers 10 and 20 in another way.

The protective layers 30A, 30B are electrically connected to a detection circuit 40, as schematically represented in FIG. 3. This detection circuit or device 40 has the function of monitoring an electrical information of the protective layers 30A, 30B and detecting a physical attack of at least one of the two protective layers 30A, 30B, based on the monitored electrical information. The detection circuit 40 is integrated in the active layer(s) 20 of the integrated circuit device 100. Each protective layer 30A, 30B is connected to the detection circuit 40 through one or more TSV (Through Silicon Via).

More precisely, the detection circuit 40 can be configured to monitor a relative electrical value between the two protective layers 30A, 30B. Such a relative value is expected to remain constant, or almost constant, over time. In particular, a change of temperature of the integrated circuit device 100 should not have an impact on this relative value.

The relative electrical value can be a capacitance between the two protective layers 30A, 30B. Alternatively, the relative electrical value can be a difference of electrical resistances between the two protective layers.

The detection circuit 40 is configured to measure this relative electrical value between the two protective layers 30A, 30B, and monitor it by determining whether or not it remains constant, or almost constant, over time in order to detect a physical attack. To this end, a tolerance range including a reference value can be used by the detection circuit 40. A variation of the monitored relative electrical value within this tolerance range can be accepted, while a variation of the monitored relative electrical value out of the tolerance can be detected as a physical attack by the detection circuit 40. In other words, if the measured relative electrical value is within this tolerance range, it is considered to remain constant (or almost constant) and no physical attack is detected. But, if the measured relative electrical value is out of the tolerance range, it is considered not to remain constant and a physical attack is detected. The tolerance range could be characterized by experiments in order to allow an efficient detection of attacks and avoid false detections. For example (only), a variation of plus or minus 10% compared to a reference value, can be tolerated (considered as "almost constant"). However, this value of ±10% is only an example. Another tolerance range could be determined as appropriate, for example ±5% or ±30% compared to the reference value, or any other values determined experimentally suitable for efficient detection of attacks and avoidance of false detections.

The integrated circuit device 100 further comprises an electronic protection circuit 50, as represented in FIG. 3. This protection circuit 50 is connected to the detection circuit 40. In operation, when the integrated circuit device is physically attacked, by digging one of the protective layers 30, this physical attack is detected by the detection circuit 40 and signaled to the protection circuit 50. Consequently, the protection circuit 50 generates a control signal for executing an electronic protection countermeasure. For example, the control signal is a command to erase one or more memories, or to block the operation (functioning) of the integrated circuit device, or any other countermeasure intended to protect secret or sensible information of the integrated circuit device 100.

Thanks to the detection circuit 40 and protection circuit 50, the protective layers 30A, 30B are not only used as a passive protection to block laser or electromagnetic signals going into the integrated circuit (chip) or electromagnetic emanations outside the chip but also as components that trigger an active countermeasure when the integrated circuit device 100 undergoes a physical attack and the attacker tries to get rid of all or part of one of the protection layers 30A, 30B.

The integrated circuit device 100 can also comprise a mold cap 60 covering the set of overlapping layers 10, 20, 30A, 30B, 31A, 31B.

The integrated circuit device 100 can be supported by a carrier 200. This carrier 200 can support conductive tracks to which the circuit(s) of the integrated circuit device 100 are connected. Such a configuration allows a redistribution of the conductive tracks in order to facilitate the connection of the integrated circuit device 100 to other electronic devices. This carrier 200 can be supported by another larger carrier (not represented) supporting other electronic components or devices. The electrical connection between the carrier 200 and the larger carrier can use solder ball terminals, as shown in FIGS. 1 and 2.

First Embodiment

Figure 2:
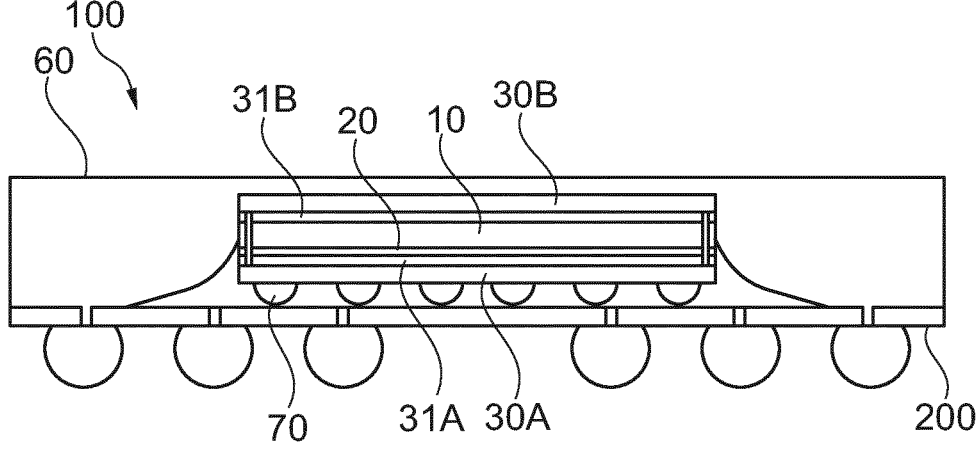
FIG. 2 shows an integrated circuit device according to a second embodiment.

FIG. 1 shows a first embodiment of the integrated circuit device 100 that is designed for wire bonding. The integrated circuit device 100 is a wire-bond package. This embodiment is compliant with the above disclosure. The characteristics specific to this first embodiment will now be described with reference to FIG. 1.

As the first embodiment of the integrated circuit device 100 is designed for wire bonding, a plurality of connection wires 21, for example in Au, connect the circuit(s) of the active layer(s) 20 to conductive tracks supported by the carrier 200 for a redistribution of the connections, as well known by the person skilled in the art. The layers of the integrated circuit device 100 overlap each other from the carrier 200 to the mold cap 60 (i.e., from bottom to top in FIG. 1), in the following order: protective layer 30B, joining layer 31B, semiconductor substrate layer 10, active layer(s) 20, joining layer 31A and protective layer 30A.

According to the first embodiment, the protective layers 30A, 30B are two plates, advantageously two full plates.

Figure 7:
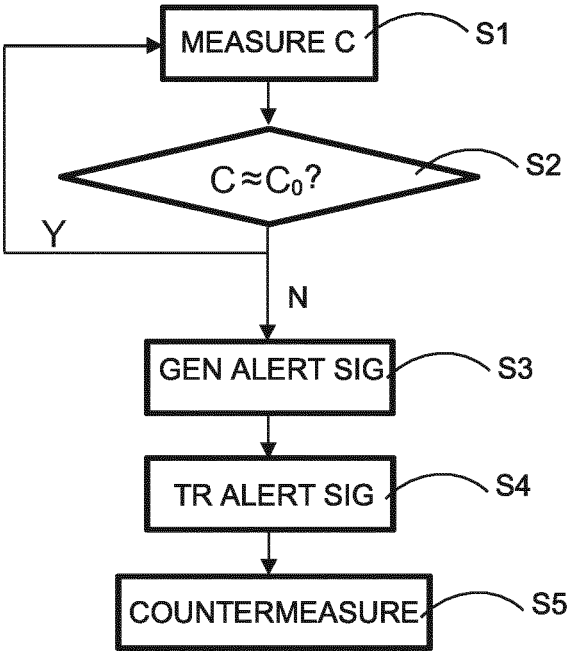
FIG. 7 is an organigram illustrating the operation of the integrated circuit device according to the first embodiment.

The operation of the integrated circuit device 100 (for example the one represented in FIG. 1) will now be described with reference to FIG. 7.

The two protective layers 30A, 30B act as physical obstacles to prevent the passage of radiations. They prevent the passage of radiations, such as a laser beam or electromagnetic radiations. In case that an attacker attacks the integrated circuit device 100 by directing a laser beam towards the active layer(s) from an external laser source, this laser beam is stopped by one of the protective layers 30A, 30B. In case of a glitch electromagnetic attack from one side of the integrated circuit device 100, the electromagnetic field generated in the vicinity of the protective layers 30 disposed on this side is blocked by this protective layer and does not disturb the active layer(s) 20. Furthermore, in case of a side channel attack, the protective layers 30A, 30B stop the electromagnetic emanations generated by the circuit(s) in operation, in such a way that an attacker cannot capture these electromagnetic emanations in order to obtain secret information.

The detection circuit 40 measures a relative electrical value between the two protective layers 30A, 30B, in a step S1. Such a monitoring can be done over the lifetime of the integrated circuit device 100 when the integrated circuit device 100 is powered. For example, the two protective layers 30A, 30B are considered as two capacitors and the difference C between the respective capacitance values of the two protective layers 30A, 30B is measured. As the measured electrical value is a 'relative' value between the two protective layers, it is expected to be constant (or almost constant) over time. Even if the temperature increases both capacitors will be similarly impacted It should not be modified by a change of temperature. However, a small variation could be tolerated within a tolerance range with respect to a reference value (for example plus or minus 10% with respect to the reference value). In a step of monitoring S2, the measured relative electrical value (e.g. difference of capacitances C) between the two protective layers 30A, 30B is monitored in order to determine whether or not it deviates from the reference value referenced as 'C$_0$' out of the tolerance range The detection circuit 40 determines if the measured relative electrical value C remains constant compared to the reference value C$_0$ or within the predefined tolerance range. If so (branch Y in FIG. 7), the detection device 40 repeats the steps S1 and S2. No physical attack is detected.

In case of a physical attack of the integrated circuit device 100, the attacker should dig into at least one of the two protective layers before accessing the active layer(s). In that case, the detection circuit 40 detects that the measured relative electrical value C changes and deviates from the reference value out of the tolerance range, in the step S2 (branch N in FIG. 7). As a result, the detection circuit 40 generates an alert signal, in a step S3, and transmits it to the electronic protection circuit 50, in a step S4. For example (only), an alert signal is generated by the detection circuit 40 when the monitored relative electrical value increases or decreases by more than 10% compared to the reference value.

Upon reception of the alert signal, the electronic protection circuit 50 controls the execution of an electronic countermeasure to protect the integrated circuit device 100, in a step S5. The countermeasure can be one or more of the following actions: erasing one or more memories of the integrated circuit device 100, blocking the operation of the integrated circuit device 100, or any other electronic countermeasure known by the skilled person.

Instead of the capacitance, the difference between the respective resistance values of the two protective layers 30A, 30B could be measured and monitored. Alternatively, any other electrical property of the two protective layers 30A, 30B that is expected to remain constant or almost constant over time, even in case of a change of temperature, could be measured and monitored by the detection circuit 40.

As previously explained, the protective layers 30A, 30B provide a physical and passive protection against attacks like side-channel attacks and fault attacks. As a result, an attacker needs to get rid of all or part of at least one of the two protective layers 30A, 30B. Drilling a hole in one of the protective layers 30, or integrally removing one of the protective layers 30, will have the effect of triggering a security mechanism that executes a countermeasure like a memory wipe. The security mechanism could be of any kind and the present disclosure is not limited to some specific countermeasures.

Variant 1 of the First Embodiment

In a variant of the first embodiment, at least one of the two protective layers 30A, 30B (i.e., either one of them or both of them) can be made of a single continuous wire 32 that is bent in order to form parallel lines.

FIGS. 4A and 4B illustrates an example of this first variant of the first embodiment. In this example, the structure of the integrated circuit device 100 is similar to the structure of the first embodiment, but one bent continuous wire 32A, 32B is used to replace each protective plate and acts as the protective or shield layer 30A, 30B. The bent continuous wire 32, 32B can be joined to the active layer(s) or the semiconductor substrate layer through a joining (interface) layer 31A, 31B, as previously described in the first embodiment. Thus, each bent wire 32A, 32B extends over the corresponding joining layer 31A, 31B.

FIG. 4A is a top view of the overlapping layers 30A, 31A, 20, 10, 31B, 30B of the integrated circuit device 100. It shows the protective layer 30A formed by the single bent wire 32A. FIG. 4B shows a side view of the overlapping layers 30A, 31A, 20, 10, 31B, 30B.

In each protective layer 30A, 30B, the parallel lines of wire are very close to each other. The space between two adjacent lines can be very small, for example a few microns.

Each bent wire 32A (32B) forms a shield that protects the integrated circuit device against attacks, similarly to a full plate. In addition, the fact that the shield is provided by a single wire facilitates the detection in case of an attack of the shield. Indeed, it is very easy to detect whether or not the wire has been cut.

Variant 2 of the First Embodiment

A second variant of the first embodiment is similar to the first variant described above embodiment and only differs from it in that each bent continuous wire 32A (32B) is supported by a printed circuit board (PCB) 33 (referred as 33A for one side and 33B for the other side of the integrated circuit device). The printed circuit board 33A (33B) forms an intermediate layer between the protective layer 30A (30B) and the joining layer 31A (31B). The wire 32A (32B) is printed on the corresponding PCB 33A (33B). This allows to improve the physical protection. The protection against the different attacks provided by such a configuration is very close to the protection provided by a full plate.

The printed circuit board carrying a bent continuous wire can be provided on one side or on both sides of the integrated circuit device.

The first and second variant of the protective layers could be used in an integrated circuit device according to the first embodiment but also in an integrated circuit device provided with another interface for interconnection to an external circuitry suitable to receive this kind of protective layer(s).

Second Embodiment

A second embodiment of the integrated circuit device is similar to the first embodiment but differs from this first embodiment in that it is a flip chip system, as shown in FIG. 2.

Solder ball terminals 70 connect the circuit(s) of the active layer(s) 20 to conductive tracks supported by the carrier 200, for a redistribution of connection terminals of the active layer(s). The overlapping layers are arranged from the carrier 200 to the mold cap 60 (from bottom to top in FIG. 2) in the following order: protective layer 30A, joining layer 30A, active layer(s) 20, semiconductor substrate layer 10, joining layer 31B and protective layer 31B. Cylindrical conductive posts (e.g. made of copper), not represented in FIG. 2, are interposed between the solder ball terminals 70 and the connection terminals of the active layer(s) 20 and arranged through holes provided in the protective layer 30A, as well known by the skilled person.

The operation of the integrated circuit device according to the second embodiment is similar to the operation of the integrated circuit device according the first embodiment.

Third Embodiment

In a third embodiment, each protective layer 30 comprises a mosaic of elementary plates, as the elementary plates 34A shown in FIG. 6. Each elementary plate 34A is electrically connected to the detection circuit 40, for example by TSV. The two protective layers 30A and 30B are identical. It means that each elementary plate 34A of the first protective layer 30A faces a corresponding elementary plate 34B of the second protective layer 30B. The two corresponding elementary plates 34A, 34B facing each other are coupled.

In operation, the detection circuit 40 measures a relative electrical value between the two coupled elementary plates for each pair of elementary plates 34A, 34B. For example, the detection circuit 40 is configured to measure a capacitance between the two coupled elementary plates or a difference between the respective resistances of the two coupled elementary plates.

Such a configuration of the protective layers could be used in an integrated circuit device in a wire bond package (first embodiment), or in a flip chip system (second embodiment), or in another package of integrated circuit device provided with another type of interface for interconnection to an external circuitry.

In a variant, the elementary plates 34A (34B) could be supported by a printed circuit board, as previously described.

The integrated circuit device 100 can be integrated in a product. The present disclosure also concerns such a product.

The invention claimed is:

1. An integrated circuit device comprising:
a semiconductor substrate layer; and
at least one active layer including electronic components and supported by said semiconductor substrate layer, wherein:
  the semiconductor substrate layer and the at least one active layer are sandwiched between two protective layers acting as physical obstacles to prevent passage of radiations and electrically connected to a detection circuit, and
  the detection circuit is configured to monitor electrical information of the two protective layers and detect a physical attack of at least one of the two protective layers, based on the monitored electrical information, and the detection circuit is configured to measure a relative value between respective electrical values of the two protective layers, and detect a deviation of the measured relative value from a reference value to detect the physical attack.

2. The device according to claim 1, wherein the detection circuit is integrated within the at least one active layer.

3. The device according to claim 1, further comprising an electronic protection circuit configured to generate a signal for executing an electronic protection countermeasure, when the physical attack is detected by the detection circuit.

4. The device according to claim 3, wherein the electronic protection circuit is integrated within the at least one active layer.

5. The device according to claim 1, wherein the two protective layers are configured to prevent the passage of radiations of a group including laser radiations, electromagnetic emanations from the at least one active layer, and electromagnetic radiations produced by an external source.

6. The device according to claim 1, wherein the two protective layers are made of metal, a metal alloy, or a semi-conductor material.

7. The device according to claim 1, wherein at least one of the two protective layers is a full plate.

8. The device according to claim 1, wherein at least one of the two protective layers is made of a bent continuous wire forming parallel lines.

9. The device according to claim 1, wherein each of the two protective layers comprises a mosaic of elementary plates electrically connected to the detection circuit.

10. The device according to claim 1, wherein the detection circuit is configured to measure a capacitance between the two protective layers, as said electrical information of the two protective layers.

11. The device according to claim 1, wherein the detection circuit is configured to measure a difference of electrical resistances between the two protective layers, as said electrical information of the two protective layers.

12. The device according to claim 1, wherein the detection circuit is configured to detect the deviation of the measured relative value from the reference value, out of a predefined tolerance range.

13. The device according to claim 1, wherein the two protective layers are joined to the semiconductor substrate layer and the at least one active layer, through two respective joining layers functioning as electrical insulators.

14. A product comprising:

an integrated circuit device that includes:

a semiconductor substrate layer, and at least one active layer including electronic components and supported by the semiconductor substrate layer, wherein:

the semiconductor substrate layer and the at least one active layer are sandwiched between two protective layers acting as physical obstacles to prevent passage of radiations and electrically connected to a detection circuit, and the detection circuit is configured to monitor electrical information of the two protective layers and detect a physical attack of at least one of the two protective layers, based on the monitored electrical information, and the detection circuit is configured to measure a relative value between respective electrical values of the two protective layers, and detect a deviation of the measured relative value from a reference value to detect the physical attack.

15. An integrated circuit device comprising:

a semiconductor substrate layer, wherein:

the semiconductor substrate layer and at least one active layer are sandwiched between two protective layers acting as physical obstacles to prevent passage of radiations and electrically connected to a detection circuit, and the detection circuit is configured to monitor electrical information of the two protective layers and detect a physical attack of at least one of the two protective layers, based on the monitored electrical information, and the detection circuit is configured to measure a relative value between respective electrical values of the two protective layers, and detect a deviation of the measured relative value from a reference value to detect the physical attack.

16. The device according to claim 2, further comprising an electronic protection circuit configured to generate a signal for executing an electronic protection countermeasure, when the physical attack is detected by the detection circuit.

17. The device according to claim 2, wherein the two protective layers are configured to prevent the passage of radiations of a group including laser radiations, electromagnetic emanations from the at least one active layer, and electromagnetic radiations produced by an external source.

18. The device according to claim 3, wherein the two protective layers are configured to prevent the passage of radiations of a group including laser radiations, electromagnetic emanations from the at least one active layer, and electromagnetic radiations produced by an external source.

19. The device according to claim 2, wherein the two protective layers are made of metal, a metal alloy, or a semi-conductor material.

20. The device according to claim 15, wherein the relative value corresponds to a capacitance between the two protective layers or corresponds to a difference of electrical resistances between the two protective layers.

* * * * *